Feb. 12, 1957    A. C. SCINTA ET AL    2,780,824
WINDSHIELD CLEANER
Original Filed March 22, 1947
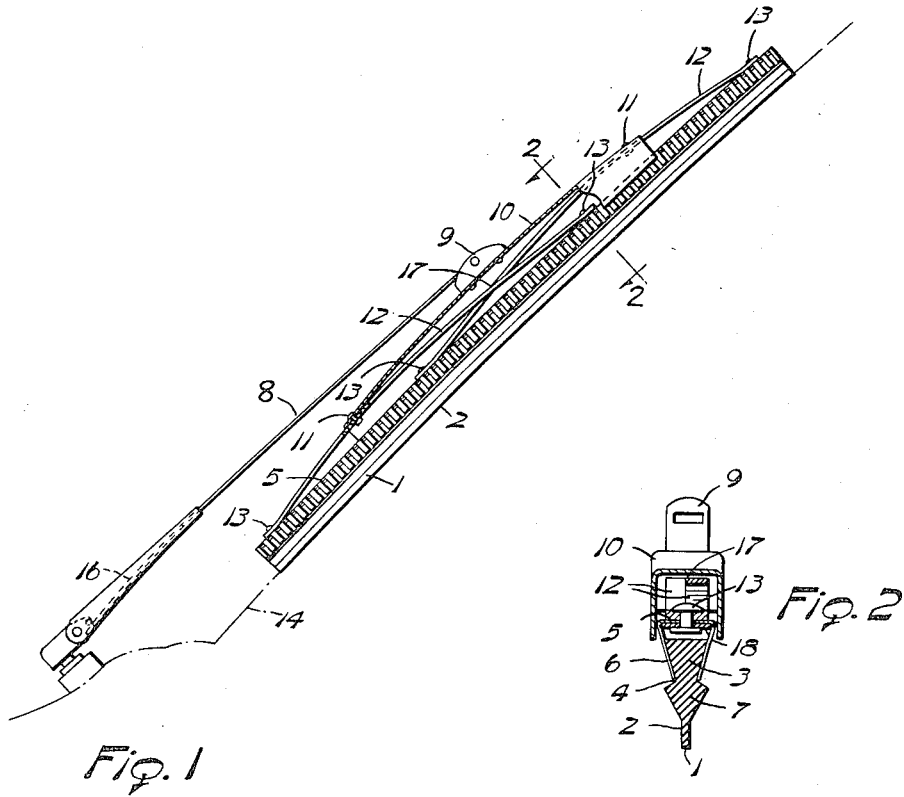
Fig. I
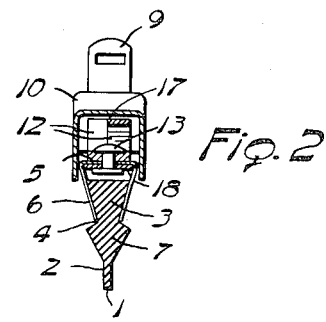
Fig. 2
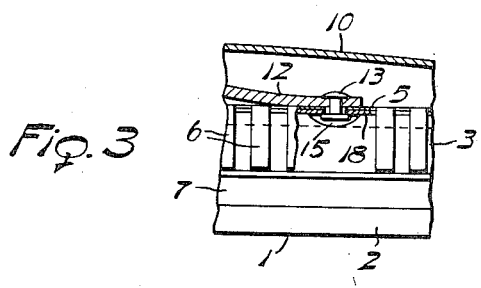
Fig. 3
Fig. 4
INVENTORS
ANTHONY G. SCINTA
and ANTON RAPPL, deceased
MARION TRUST COMPANY of Buffalo,
BY                          Executor
Bean, Brooks, Buckley & Bean,
ATTORNEYS United States Patent Office 2,780,824
Patented Feb. 12, 1957

2,780,824
WINDSHIELD CLEANER

Anthony C. Scinta, Buffalo, N. Y., and Anton Rappl, deceased, late of Eggertsville, N. Y., by The Marine Trust Company of Buffalo, executor, Buffalo, N. Y.; said Scinta and Rappl assignors to Trico Products Corporation, Buffalo, N. Y.

Application June 25, 1953, Serial No. 364,046, now Patent No. 2,672,641, dated March 23, 1954, which is a continuation of application Serial No. 736,492, March 22, 1947. Divided and this application February 25, 1954, Serial No. 412,544

5 Claims. (Cl. 15—245)

This invention relates to the windshield cleaning art and primarily to a wiper or blade for the well-known automatic windshield cleaning mechanism currently used on the modern car.

More particularly the invention relates to a cleaner for wiping the surface of curved windshields and windows, the primary object of the present invention being to provide a wiper wherein the spring pressure from its actuating arm is transmitted through a resilient support for the wiping blade to more effectively and uniformly wipe the curved surface.

It has heretofore been proposed to suspend a wiping member between spaced points of suspension by means of yokes to effectively apply the spring pressure along the blade in a surface-conforming manner.

The present invention further has for its object to provide a wiper for curved surfaces in which a wiping pressure would be more effectively distributed throughout the length of the wiping edge through an arrangement of yokes that affords a sturdiness in the structure to resist stress and strain as the wiper is swept sidewise over the curved surface.

Further, the invention will be found to reside in a curved surface wiper wherein its pressure distributing super-structure is associated with a continuous backing support for the wiping element in a manner to provide a compactness and low sitting structure for reducing its surface exposure to the wind currents in minimizing the lifting tendency of the latter and thereby insuring a more effective wiping action.

The invention will also be found to reside in an improved construction of wiper which is practical and one which will readily conform itself to the surface being wiped.

The foregoing and other objects will manifest themselves as the following description progresses, reference being had to the accompanying drawing, wherein:

Fig. 1 is a view partly in longitudinal section and partly in side elevation of a windshield cleaner constructed in accordance with the present invention;

Fig. 2 is a cross sectional view taken about on line 2—2 of Fig. 1;

Fig. 3 is a detailed view in side elevation, with parts broken away to more clearly show its connection to the blade;

Fig. 4 is a fragmentary longitudinal section taken in a plane immediately beneath the back wall of the primary yoke.

This application is a division of application Serial No. 364,046, now Patent 2,672,641, March 23, 1954, which was a continuation of Serial No. 736,492, filed March 22, 1947, since abandoned.

Referring more particularly to the drawing, the numeral 1 designates the rubber or squeegee body of the blade, the same having a wiping edge 2 along one margin which is preferably continuous from end to end. The opposite margin of this molded rubber body may be enlarged as at 3 and provided with opposite side faces 4 converging toward the wiping edge 2 to thereby give the same a generally triangular cross sectional shape. The rubber body is provided with a thin backing strip 5 of spring metal or the like, which backing strip has body embracing fingers 6 along its opposite margins for clampingly gripping upon the converging faces 4. Outwardly beyond the fingers 6 the rubber body may be formed with side ribs 7 to give support to the relatively thin wiping edge 2 and at the same time provide substantial thickness to the body where it may fold or bend over the outer ends of the fingers.

The wiper is attached to its carrying arm 8 by a suitable clip 9 and is directly supported by a pressure distributing frame or holder to which the clip is secured. The pressure distributing frame comprises a primary yoke member 10 and plural secondary yoke members 12, the latter being connected to the opposite ends of the primary yoke, as by pins 11. The opposite ends of each secondary yoke member are connected by pin and slot connections 13 to the backing strip 5, sufficient clearance being provided to afford ample play for accommodating relative movement between parts as the wiping edge conforms itself to changes in surface contour of the curved windshield surface indicated by the numeral 14. The rubber body may have its back margin notched out, as indicated at 15, to carry out the thought of this play.

The inner ends of the secondary yokes are extended to cross or overlap each other, as at 17, thereby affording a torque resisting structure which will give to the intermediate blade portion proper support against twisting between the remote points of support. Preferably the secondary yokes are formed of flat spring stock. In the illustrated embodiment the pins or rivets are positioned normal to the backing strip, with the several slots being formed along the center line thereof. If desired, a second spring strip 18 may underlie the backing strip to reinforce the same, and for a like purpose the inner extremities of the secondary yokes may be enlarged for receiving the fasteners, as shown in Fig. 4. The secondary yokes are flexibly connected by the pin and slot means 11 to the opposite ends of the primary yoke 10 to afford sufficient play between parts for surface conformance of the wiping edge. The secondary yoke flat spring could have its end portions separately fastened to the primary yoke since its movement is a yielding one and its pressure applying arms are of relatively different strength and tension.

When wiping over a convex surface the back portion of the squeegee unit 1, 5 will move relative to the primary yoke 10 into the latter, and in this connection it will be observed that the primary yoke is curved longitudinally and of channel shape in cross section, Fig. 2. The back portion of the squeegee unit is designed to have a movement of recession within the channeled primary, this being permitted by the nested relation of the squeegee unit within the arcuate channel formation of the primary yoke. By reason of this nesting of the back portion of the squeegee unit within the channel of the primary yoke the pressure distributing superstructure 10, 12 will be brought down closer to the wiping element 1 and thereby reduce the height of the wiper on the windshield. The low sitting superstructure provides for compactness and reduces the upstanding surface area exposed to wind currents to minimize the lifting tendency of the latter upon the wiper. When moving over a concave surface the back portion of the wiper will have a movement in a direction outward of the primary channel.

The secondary yokes are so arranged with respect to the primary yoke that a differential pressure applying blade support is provided to give more uniformity in the distribution of the arm imposed spring pressure to the wiping edge. Obviously, this support will function on a plane surface as well as on a curved surface in efficiently distributing the arm pressure. The squeegee or rubber body may be readily removed from the pressure differential support by simply sliding the body lengthwise from between the embracing fingers 6 when it is desired to replace the same with a new wiping edge. These fingers together with the backing strip 5 form a seat for the squeegee body. At the same time these fingers do not detract from the flexibility of the backing strip since the fingers are free to move relative to each other.

The secondary yokes provide transversely flat underfaces which recede into the primary channel as the secondaries carry the squeegee unit therewith, such flat underfaces moving closer to the transversely flat bottom of the inverted channel to jointly form therewith a supporting surface for the squeegee unit as its back portion recedes thereinto.

By reason of the foregoing construction and arrangement, the inner ends of the secondary yokes are disposed intermediate the outer ends of the primary yoke. The pressure differential provides for the application of a lighter pressure at such intermediate points relative to the urge impressed upon the outer or opposite ends of the blade. This gives a controlled distribution of the arm impressed urge. The outer ends of the primary yoke are flexibly connected by the pin and slot connection 11 to give freedom of movement to the blade in conforming its wiping edge to the windshield surface. Should occasion demand, a reversal of the lever differential may be obtained for giving a relatively heavier pressure to the intermediate portion of the blade as compared to that applied to the opposite ends thereof.

The connecting members 13 not only serve as torque-resisting members in that they resist rotational movement of the backing strip but they also serve to hold the multiple leaves 5 and 18 in assembled relation thereby providing a backing for the blade of leaf spring construction for greater resiliency, one leaf only being formed with the blade gripping fingers 6. These torque-resisting members 13 slidably support the backing strip up against the underfaces of the ends of the secondary yokes to insure a nesting relation of the backing strip with the primary channel when passing over a convex surface. This nesting relation between the side walls of the primary channel affords lateral support for the sliding connection 13 and, further, it provides for a compact wiper structure with a minimum surface exposure to the cross wind currents which tend to lift the wiper off the glass.

While the foregoing description has been given in detail it is not the intention to thereby limit the invention since the inventive principles involved are capable of assuming other physical embodiments without departing from the spirit of the invention and the scope of the appended claims.

What is claimed is:

1. A windshield cleaner comprising a squeegee unit having a flexible blade body and a flexible nonextensible backing strip therefor conformable to the surface being wiped, a pressure distributing holder comprising a primary yoke and plural secondary yokes longitudinally and movably mounted on the opposite ends of the primary yoke, the outer ends of the secondary yokes being operatively connected to the backing strip and the inner end portions of the secondary yokes crossing each other and having their inner extremities slidably bearing in transverse facial contact on the backing strip, and means slidably connecting said inner extremities of the secondary yokes to the backing strip for sliding thereon longitudinally thereof.

2. A windshield cleaner comprising a flexible squeegee unit conformable to the surface being wiped and including a flexible blade body and a nonextensible backing strip therefor flexible in surface conformance, a pressure distributing holder comprising a longitudinally disposed channeled primary yoke and plural secondary yokes longitudinally mounted on the opposite ends of the primary yoke and having their outer ends operatively connected to the backing strip and their inner ends crossing one another within the channel of the primary yoke to jointly form a longitudinal series of spaced points of support for the squeegee unit throughout the length of the holder, and means slidably connecting said inner ends of the secondary yokes to the backing strip, the back portion of the squeegee unit being carried by said inner ends for receding movement within the channel of the primary yoke to receive lateral support for the connecting means by the side walls of the channel when the squeegee unit is moved sidewise over a convex surface.

3. A windshield cleaner comprising a flexible squeegee unit conformable to the surface being wiped and including a flexible blade body and a nonextensible backing strip therefor flexible in surface conformance, and a pressure distributing holder comprising a channeled primary yoke and plural secondary yokes longitudinally mounted on the opposite ends of the primary yoke and having their outer ends operatively connected to the backing strip and their inner ends crossing one another within the channel of the primary yoke to jointly form a longitudinal series of spaced points of support for the squeegee unit throughout the length of the holder.

4. A wiper for cleaning a curved surface, comprising a blade flexible for conforming to the surface curvature, a longitudinally mounted primary yoke having an arm attaching part, and a longitudinally mounted secondary yoke for each end of the primary yoke connected intermediate its ends to the respective end of the primary yoke and having its opposite ends flexibly connected to the blade, said blade having a flexible backing strip to which the opposite ends of the secondary yokes are connected, each secondary yoke being in the form of a flat spring with one of its resilient ends slidably connected to the backing strip, the inner end portion of the secondary yokes crossing one another to mutually afford lateral support for the secondary yokes.

5. A wiper for cleaning a curved surface, comprising a blade flexible for conforming to the surface curvature, a longitudinally disposed primary yoke having an arm attaching part, a longitudinally disposed secondary yoke for each end of the primary yoke connected intermediate its ends to the respective end of the primary yoke and having its opposite ends flexibly connected to the blade, such blade having a surface-conforming backing strip to which the opposite ends of the secondary yokes are connected, said backing strip having a resilient and continuous back portion with blade straddling fingers on its opposite side margins for holding the blade and strip together, and a spring strip interposed between the blade and the backing strip and lying between the straddling fingers to form therewith a multi-leafed surface conforming backing for the blade.

References Cited in the file of this patent

UNITED STATES PATENTS

| | | |
|---|---|---|
| 1,463,590 | Pedersen | July 31, 1923 |
| 2,543,383 | Scinta | Feb. 27, 1951 |
| 2,596,063 | Anderson | May 6, 1952 |